July 30, 1940.   H. S. OGDEN   2,209,826
PROTECTIVE SYSTEM
Filed Feb. 25, 1939
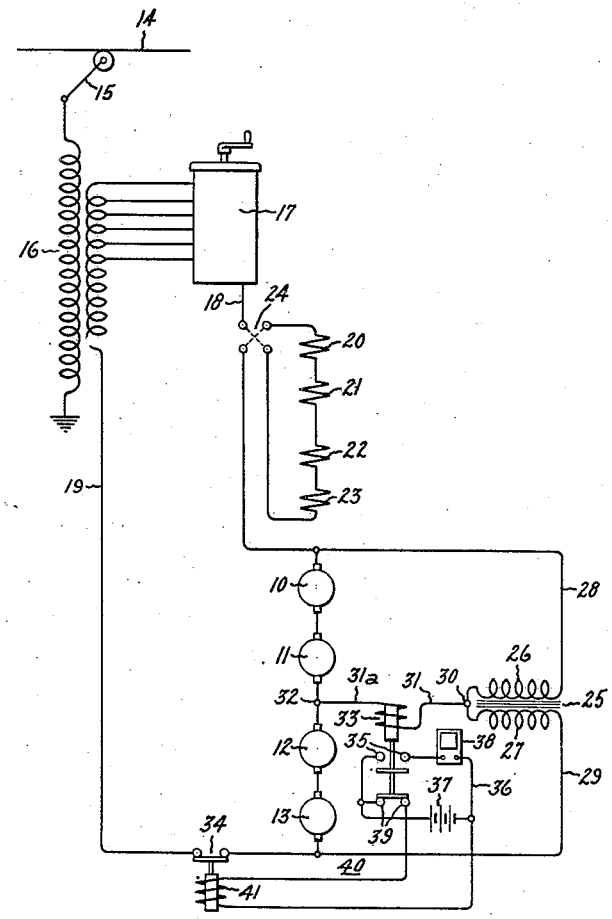
Inventor:
Harold S. Ogden,
by Harry E. Dunham
His Attorney.

Patented July 30, 1940

2,209,826

UNITED STATES PATENT OFFICE 2,209,826

PROTECTIVE SYSTEM

Harold S. Ogden, Erie, Pa., assignor to General Electric Company, a corporation of New York Application February 25, 1939, Serial No. 258,449

7 Claims. (Cl. 172—179)

My invention relates to protective systems for electric motors, more particularly to systems for protecting a plurality of alternating current electric traction motors against wheel slippage, and has for an object a simple and reliable protective system of this type.

In the operation of a plurality of electric motors separately connected to the driving axles of a vehicle, one pair of wheels connected to an axle sometimes slips on the track, especially when rapid acceleration is attempted under heavy load conditions. When this slipping occurs, the motor or motors connected to the slipping axle accelerate to a higher speed than the other motors and may reach a speed causing damage to the motor on account of the resulting high mechanical stresses and of flash-over at the commutator.

In carrying out my invention, I provide protective means in which the effect of a difference in voltages of the motors is utilized to force more current through the motor which is not slipping and increase its torque and at the same time decrease the current through the slipping motor and thereby reduce its torque. The system is further arranged to operate a current responsive device for disconnecting the supply to the motors in the event that excessive current is drawn for transfer from the slipping motor to the motor that is not slipping.

In one form of my invention I provide a transformer which is connected across the motor circuit, the two windings of the transformer being connected in series circuit with each other. The midpoint between the two windings is connected to the midpoint between the motors which drive different axles of the vehicle. A relay responsive to the current in the conductor between the aforementioned midpoints is provided and it may be connected either directly in circuit or through a current transformer. The relay has for its purpose the operation of a contactor in the main supply line upon excessive current conditions in the conductor. The same or a separate relay also may be provided with indicating means to indicate to the operator the current conditions in this conductor.

For a more complete understanding of my invention, reference should be had to the accompanying drawing, the single figure of which is a diagrammatic representation of my invention as applied to an electrically operated vehicle such as an electric locomotive.

Referring to the drawing, I have shown my invention in one form as applied to series connected twin driving motors 10—11 and 12—13 of the single phase commutator type. It is obvious, of course, that a single motor may be substituted for either or both of the pairs of twin motors if desired without departing from the spirit and scope of my invention. The motors are energized from the trolley wire 14, supplied with single phase alternating current, energy being taken off through a trolley 15 and a transformer 16. By means of a suitable manually operated controller 17 which may be a drum controller, the supply conductor 18 leading to one side of the motor circuit is connected to a selected tap of suitable voltage on the secondary winding of the transformer 16 so as to control the speed of the motors, the other side of the motor circuit being connected through a supply conductor 19 to the other side of the transformer secondary. The field windings 20, 21, 22 and 23 are provided respectively for the motors 10, 11, 12 and 13 and are connected in series with each other and with the motor circuit through a reversing connector 24.

For protection of the motor against wheel slippage, I have provided the transformer 25 comprising the series connected windings 26 and 27 which are in mutually inductive relation and which are connected at one side by a conductor 28 to the reverser 24 and to the motor 10 and at the other side by conductor 29 which is connected to the motor 13 and the conductor 19 through contactor 34. The midpoint 30 between the windings 26 and 27 is connected by a conductor 31 to the indicating relay 33, then by conductor 31a to a midpoint 32 in the circuit between the two pairs of twin motors 10—11 and 12—13.

The windings 26 and 27 are wound with a suitable number of turns in a 1:1 ratio so that a 1:1 ratio of transformation between these windings is obtained. Moreover, taps may be provided on one or both windings for adjustment of a number of turns to correspond with any initial inequality in the voltages of the motors. It is understood, of course, that the windings 26 and 27 are wound on a common magnetic core, the transformer structure 25 being designed to withstand the voltages applied to it and having enough current carrying capacity so that considerable amounts of power may be transformed for short periods of time.

At this point it may be well to note that I do not wish to be limited to the exact number of motors and axles driven thereby that are described herein, since the numbers of motors and axles may be increased without departing from the spirit and scope of my invention. It is believed that it will be obvious to one skilled in the art that my invention may be adapted for use with any number of traction motors forming any number of groups of motors connected in serial relationship for driving a like number of axles, i. e., one axle driven by one group of motors, and so on. For instance, if three motors or three groups of motors are to be serially connected for driving three axles, the transformer would become a three winding transformer, the details of connections being slightly different than those for two axles and two groups of motors shown in the drawing.

A suitable indicating and tripping relay 33 is provided either directly in circuit with the conductors 31 and 31a or connected responsive to the current in these conductors through a suitable current transformer. The relay is adapted to indicate the current conditions in the conductors 31 and 31a and provide a power trip of a contactor 34 in the main supply circuit to the motors at a higher value of current. The relay 33 may, of course, consist of a pair of separate relays or be a single unit which performs both the indicating and tripping functions.

As shown I prefer to connect the winding of the relay 33 directly in series circuit with the conductors 31 and 31a. A pair of normally open contacts 35 are provided in an indicating circuit 36 supplied from a suitable source, such as a battery 37, and suitable indicating means, such as a buzzer 38, is provided to furnish a signal or indication to the operator. A pair of normally closed contacts 39 also operable by the relay 33 are provided in a series circuit 40 supplied by the battery 37 for causing the normally energized winding 41 of the contactor 34 to be de-energized for opening the contactor 34 upon excess current conditions occurring in the conductors 31 and 31a by wheel slippage.

Under ordinary conditions of operation without slippage of the driving wheels of the vehicle driven by the motors, the voltages across the twin motors 10—11 and 12—13 will be equal and, therefore, the voltages impressed on each of the windings 26 and 27 will be the same so that no transfer of power will occur between these windings. In the event of slippage of the wheels and axle driven by one set of twin motors, the particular winding 26 or 27 connected across the slipping motors has its energization increased by the increased voltage, i. e., counter E. M. F. of the motors, by reason of the increased speed of the motors, this effect being substantially proportional to the increasing speed of the motors. For example, if the twin motors 12—13 increase their speed due to slippage, the voltage across them becomes greater than the voltage across the other pair of twin motors 10—11 whose speed is remaining substantially constant. With the increase of voltage across the motors 12—13, a current flow will be set up in the winding 27 in a direction from the armature 12 through the conductor 31, the winding 27, and the conductor 29. In this manner, the net current now flowing through the motors 12—13 is reduced by some value which we may call It. Therefore, where I is the total motor current and It is the current through the transformer winding 27, the net current flowing through the twin motors 12—13 is equal to I minus It. The current It in the winding 27 of the transformer 25 will induce a like current in the other windings 26 of the transformer 25 flowing in the opposite direction, i. e., through the winding 26 and the conductor 28 to the twin motors 10—11 so that the current in these motors then becomes I plus It.

From this, it is clear that the torque on the slipping motors 12—13 has been reduced because the current through them is reduced from a value I to a value I minus It and the current through the motors 10—11 which are not slipping is increased from a value I to a value I plus It and their torque accordingly increased. Thus it is seen that the motors 12—13 cannot rotate at a speed that is materially different from a speed of the motors 10—11 and the difference in speed of rotation between the two sets of motors will be just sufficient so that enough current will flow through the armatures and transformer to maintain this condition.

Should the motors 10—11 be the ones that slip, the voltage across them becomes greater than the voltage across the other motors 12—13 and the direction of the current in the transformer 25 is reversed, or opposite from that just described, giving a reduction in torque on the motors 10—11 and an increase in torque on the motors 12—13 in the same manner as for the first case described above.

The indication of slipping on the part of either of the two sets of motors is obtained at the indicating buzzer 38 when there is a transfer of power between the two windings 26 and 27 of the transformer 25. The relay 33 will pick up and close the contacts 35 to complete the buzzer circuit 36. The contacts 35 are arranged to close before the contacts 39 open so that the operator is informed of the occurrence of slippage. Should the slippage be unduly severe so as to cause a condition of excess current in the conductors 31 and 31a, the relay 33 will serve to open the contacts 39 and thereby the contactor 34 for interrupting the supply line 19 to the motors. If desired, the relay 33 may be made to latch in its full tripped position to require the operator to make a special movement of his controller to reset it with the power off the traction motors.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. The combination with a plurality of groups of electric motors connected for energization in circuit with each other, each of said groups comprising at least one of said motors, of means for preventing excessive overspeeding of the motors in one of said groups with respect to the motors in at least one other of said groups comprising a winding for each of said groups of motors, said windings being in mutually inductive relationship, connecting means between said windings and the circuit of said motors for decreasing the current supplied to said overspeeding motor group and increasing the current supplied to said other motor group to change the torque relationship of said motor groups in a predetermined manner, current responsive means operable by a predetermined current condition in said connecting means for de-energizing said motor circuit, and signal means operable responsive to a predetermined electrical condition in said connecting means for indicating said electrical condition.

2. The combination with a plurality of electric motors connected for energization in circuit with each other of means for preventing excessive overspeeding of at least one of said motors with respect to at least one other of said motors comprising a pair of series connected windings in a mutually inductive relationship, means connecting said windings across the circuit of said motors, means connecting said windings from a point between them to a point on said motor circuit between said motors whereby the current and torque of said overspeeding motor is reduced and the current and torque of said other motor consequently increased in a predetermined manner, means responsive to a predetermined electrical condition of said last mentioned connecting means for de-energizing said motor circuit, and signal means responsive to a predetermined electrical condition of said last mentioned connecting means for indicating said predetermined electrical condition.

3. The combination with a plurality of groups of electric motors connected for energization in circuit with each other, each of said groups comprising at least one of said motors, of means for preventing excessive overspeeding of the motors in one of said groups with respect to the motors in at least one other of said groups comprising a winding for each of said groups of motors in mutually inductive relationship, connecting means between said windings and the circuit of said motors for decreasing the current supplied to said overspeeding motor group and increasing the current supplied to said other motor group to change the torque relationship of said motor groups in a predetermined manner, and current responsive means operable by a predetermined current condition in said connecting means for de-energizing said motor circuit.

4. The combination with a plurality of electric motors connected for energization in circuit with each other of means for preventing excessive overspeeding of at least one of said motors with respect to at least one other of said motors comprising a winding for each of said motors in mutually inductive relationship, connecting means between said windings and the circuit of said motors for decreasing the current supplied to said overspeeding motor and increasing the current supplied to said other motor to change the torque relationship of said motors in a predetermined manner, and current responsive means operable by a predetermined current condition in said connecting means for de-energizing said circuit of said electric motors 5. The combination with electric motors connected for energization in circuit with each other of means for preventing excessive overspeeding of at least one of said motors with respect to at least one other of said motors comprising a pair of series connected windings in mutually inductive relationship, means connecting said windings across the circuit of said motors, means connecting said windings from a point between them to a point on said motor circuit between said motors whereby the current and torque of said overspeeding motor is reduced and the current and torque of said other motor is increased in a predetermined manner, and current responsive means operable by a predetermined current condition in said last mentioned connecting means for de-energizing said motor circuit.

6. The combination with a plurality of groups of electric motors connected for energization in circuit with each other, each of said groups comprising at least one of said motors, of means for preventing excessive overspeeding of the motors in one of said groups with respect to the motors in at least one other of said groups comprising a winding for each of said groups of motors in mutually inductive relationship, connecting means between said windings and the circuit of said motors for decreasing the current supplied to said overspeeding motor group and increasing the current supplied to said other motor group to change the torque relationship of said motor groups in a predetermined manner, current responsive means operable by a predetermined current condition in said connecting means for de-energizing said motor circuit, and signal means operable by said current responsive means for indicating a predetermined current condition in said connecting means.

7. The combination with electric motors connected for energization in circuit with each other of means for preventing excessive overspeeding of at least one of said motors with respect to at least one other of said motors comprising a pair of series connected windings in mutually inductive relationship, means connecting said windings across the circuit of said motors, means connecting said windings from a point between them to a point on said motor circuit between said motors whereby the current and torque of said overspeeding motor is reduced and the current and torque of said other motor is increased in a predetermined manner, current responsive means operable by a predetemined current condition in said last mentioned connecting means for de-energizing said motor circuit, and signal means operable by said current responsive means for indicating a predetermined current condition in said last mentioned connecting means.

HAROLD S. OGDEN.